US012798504B2

(12) United States Patent
Grüssing et al.

(10) Patent No.: US 12,798,504 B2
(45) Date of Patent: Nov. 17, 2026

(54) UNIT, FOR INSTALLING IN A MOTOR VEHICLE AND FOR CONNECTING TO A COMPONENT RECEPTACLE OF A MOTOR VEHICLE, AND METHOD FOR PRODUCING A UNIT OF THIS TYPE

(71) Applicant: Kirchhoff Automotive Deutschland GmbH, Attendorn (DE)

(72) Inventors: Phil Grüssing, Finnentrop (DE); Alexander Günther, Olpe (DE); Marc Horlacher, Attendorn (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 344 days.

(21) Appl. No.: 18/687,402

(22) PCT Filed: Sep. 1, 2022

(86) PCT No.: PCT/EP2022/074375
§ 371 (c)(1),
(2) Date: Feb. 28, 2024

(87) PCT Pub. No.: WO2023/031351
PCT Pub. Date: Mar. 9, 2023

(65) Prior Publication Data
US 2025/0128672 A1 Apr. 24, 2025

(30) Foreign Application Priority Data
Sep. 3, 2021 (DE) ..................... 10 2021 122 861.1

(51) Int. Cl.
*B62D 27/06* (2006.01)
*B60R 19/34* (2006.01)

(52) U.S. Cl.
CPC ............. *B60R 19/34* (2013.01); *B62D 27/06* (2013.01)

(58) Field of Classification Search
CPC ................................ B60R 19/34; B62D 27/06
See application file for complete search history.

(56) References Cited

U.S. PATENT DOCUMENTS 8,950,794 B2 2/2015 Lenkenhoff
9,446,799 B2 9/2016 Franzpötter
(Continued)

FOREIGN PATENT DOCUMENTS

DE 102011083807 A1 4/2013
DE 102012023695 A1 6/2014
(Continued)

OTHER PUBLICATIONS

English translation DE102017211106 (Year: 2017).*
(Continued)

*Primary Examiner* — Jason L Vaughan
*Assistant Examiner* — Amanda Kreiling
(74) *Attorney, Agent, or Firm* — Polson Intellectual Property Law P.C.; Margaret Polson; Christopher Sylvain

(57) ABSTRACT

A unit having a connector portion for engaging into a component receptacle for the purpose of fastening the unit. The connector portion has at least two material cut-outs opposite one another for leading through a fastener, which engages through two opposing side walls of the component receptacle and the unit. The unit includes a sleeve component which is inserted into the unit and has a sleeve arranged such that the sleeve channel of the sleeve is aligned with the material cut-outs of the unit. The sleeve component is supported on the inner side at least in portions on the material which surrounds the material cut-outs. The sleeve component is cold-worked from a sheet metal blank, in which cold working a first and a second material portion of the sheet metal blank are brought together in a contact region with one another in order to configure the sleeve channel.

14 Claims, 3 Drawing Sheets

(56) References Cited

U.S. PATENT DOCUMENTS

| | | | | |
|---|---|---|---|---|
| 9,598,100 | B2 | 3/2017 | Lenkenhoff | |
| 9,764,764 | B2 | 9/2017 | Irle | |
| 10,005,495 | B2 | 6/2018 | Töller | |
| 10,577,025 | B2 | 3/2020 | Michler | |
| 10,882,559 | B2 | 1/2021 | Gündogan | |
| 11,142,248 | B2 | 10/2021 | Günther | |
| 11,148,623 | B2 | 10/2021 | Günther | |
| 11,235,720 | B2 | 2/2022 | Höning | |
| 11,292,409 | B2 | 4/2022 | Töller | |
| 11,505,146 | B2 | 11/2022 | Weige | |
| 11,708,040 | B2 | 7/2023 | Günther | |
| 11,731,707 | B2 | 8/2023 | Tentscher | |
| 11,819,944 | B2 | 11/2023 | Töller | |
| 11,851,109 | B2 | 12/2023 | Weige | |
| 11,858,577 | B2 | 1/2024 | Günther | |
| 11,912,218 | B2 | 2/2024 | Tlauka | |
| 11,975,763 | B2 | 5/2024 | Gündogan | |
| 11,987,192 | B2 | 5/2024 | Günther | |
| 12,024,007 | B2 | 7/2024 | Günther | |
| 12,024,106 | B2 | 7/2024 | Günther | |
| 2021/0053518 | A1* | 2/2021 | Karlsson | B60R 19/34 |
| 2022/0314912 | A1 | 10/2022 | Töller | |
| 2023/0123267 | A1 | 4/2023 | Günther | |
| 2023/0131692 | A1 | 4/2023 | Lagin | |
| 2023/0166597 | A1 | 6/2023 | Günther | |
| 2023/0202567 | A1 | 6/2023 | Günther | |
| 2023/0406247 | A1 | 12/2023 | Lagin | |
| 2024/0166269 | A1 | 5/2024 | Günther | |
| 2024/0174036 | A1 | 5/2024 | Günther | |

FOREIGN PATENT DOCUMENTS

| | | | | |
|---|---|---|---|---|
| DE | 102013209579 | B3 | 10/2014 | |
| DE | 102017211106 | A1 * | 1/2019 | B62D 21/11 |
| DE | 102018208605 | A1 | 12/2019 | |
| DE | 102018131090 | A1 | 6/2020 | |
| DE | 102019102309 | A1 | 7/2020 | |
| EP | 2096003 | A1 | 9/2009 | |
| EP | 3077274 | B1 | 2/2019 | |

OTHER PUBLICATIONS

Pending U.S. Appl. No. 18/687,461, filed Feb. 28, 2024 (Gündogan et al.).

Pending U.S. Appl. No. 18/706,486, filed May 1, 2024 (Lagin et al.).

International Search Report (ISR) of the International Searching Authority (ISA-EPO) mailed Dec. 14, 2022 in parent international application PCT/EP2022/074375.

Written Opinion (WO) of the International Searching Authority (ISA-EPO) mailed Dec. 14, 2022 in parent international application PCT/EP2022/074375.

Examination Report dated Aug. 5, 2025 in related German application 10 2021 122 861.1 by applicant Kirchhoff Automotive Deutschland GmbH.

* cited by examiner

UNIT, FOR INSTALLING IN A MOTOR VEHICLE AND FOR CONNECTING TO A COMPONENT RECEPTACLE OF A MOTOR VEHICLE, AND METHOD FOR PRODUCING A UNIT OF THIS TYPE

BACKGROUND

The disclosure relates to a unit for installing in a motor vehicle and for connecting to a component receptacle of a motor vehicle. The unit has an end-side connector portion for engaging into the component receptacle for the purpose of fastening the unit. The connector portion has at least two material cut-outs opposite one another for passing through a fastener, which engages through two mutually opposite side walls of the longitudinal beam and the unit. The unit also has a sleeve component which is inserted into the unit with a sleeve arranged such that the sleeve channel of the sleeve is aligned with the material cut-outs of the unit and the sleeve component is supported, at least in portions, on the inside of the material which surrounds the material cut-outs. The disclosure further relates to a method for producing such a unit.

In a motor vehicle, connections are made between units as components in many places. An example of such a unit is a crash box, which is used to connect a bumper cross beam, or crossmember, to a longitudinal beam, or side member, as a component receptacle. A bumper cross beam of a motor vehicle is used to absorb shock forces during an accident. In order to prevent any impact on the bumper cross beam from being transmitted directly into the longitudinal beam, crash boxes are installed between the bumper cross beam and the longitudinal beam. These crash boxes are specifically deformed by a shock load in order to absorb the energy acting on the bumper cross beam in an accident.

Typically, such units, for example those designed as a crash box, comprise two opposite side walls, including a cavity between them. A crash box is, for example, designed as a profile, typically as a square hollow profile, having two opposite side walls. The side walls of the unit engage in the longitudinal beam.

To connect the unit to the component receptacle, a screw connection is preferred for easy assembly. In case of a crash box-longitudinal beam connection, a screw bolt engages both through the longitudinal beam and through the crash box, which engages in the longitudinal beam with a connector portion. The inner side of the longitudinal beam is pressed onto the outer side of the connector portion of the crash box in such a way that the two parts are connected by means of a frictional connection. This generally requires forces of 65 kN and more, up to 250 kN. To pass such a screw bolt through, corresponding opposing material cut-outs are provided in the component receptacle, or the longitudinal beam, and the unit, or the crash box.

In order to prevent a deformation of the unit under the high preload force, at least one metal sleeve is arranged in the unit, extending parallel to the screw bolt and supporting the side walls of the unit against one another. It is typically provided that the sleeve channel is aligned with the material cut-outs of the unit, so that in particular the side walls with the material surrounding the material cut-outs, through which the screw bolt is guided, are supported against one another on the inner side. In order to obtain circumferential support, the sleeve is typically substantially circumferentially closed.

Such an arrangement is disclosed, for example, in EP 3 077 274 B1. Shown here is a spacer designed as a sleeve component, to be inserted into a crash box in the form of a double sleeve, which was extruded from a solid material and successively machined.

A problem with this prior art is the complex manufacturing process of extrusion. In addition, the choice of materials is limited to materials that are easy to form (extrusion).

The easy formability is also problematic in the context of tensioning: In order to minimize flow of the material as a result of the surface pressure between the crash box and the sleeve in the prior art cited above, a solid, large-region block is provided. For this reason, the weight of such a sleeve is to be considered relatively high.

SUMMARY

Proceeding from this background, one aspect of the disclosure is to propose a unit with a sleeve that overcomes the problems mentioned above. Another aspect is to provide a method for producing such a unit.

The device-related aspect may be provided by a unit of the type mentioned at the outset, wherein the sleeve component is cold-worked from a sheet metal blank, in which cold working a first and a second material portion of the sheet metal blank are brought together in a contact region to configure the sleeve channel.

The method-related aspect may be provided by a method comprising: cold working a sheet metal blank to form a sleeve component having at least one sleeve, such that a free end of the sheet metal blank is brought toward a contact region of the sheet metal blank to form a sleeve of the sleeve component; connecting the contact region to the free end of the sheet metal blank; inserting the sleeve component into the unit and connecting the sleeve component to the unit.

By forming the sleeve component as a separate component from a sheet metal blank in a cold working process, the sleeve component can be manufactured not only extremely economically, but also in a highly customizable way. Through simple tool adjustments, a variety of possible sleeve cross-sectional shapes are conceivable, which can be adapted to the exact installation location. In addition, there is a significantly greater freedom of choice regarding material, so that higher-strength materials than in the prior art, such as steels that cannot be extruded, can also be used. The sleeve of the sleeve component can therefore be provided with a significantly smaller wall thickness and still absorb the required preload forces.

Due to the permanent positional accuracy of the unit relative to the component receptacle through the effective pre-tensioning of both parts, the resulting gap dimensions in the entire vehicle also correspond to tight tolerance specifications. This is particularly important if the unit or components connected to the unit, such as the bumper cross beam connected to the unit designed as a crash box, sometimes also have to cooperate with assemblies on the outside. Due to the high pre-tensioning forces, a relative movement between the crash box and the longitudinal beam is counteracted, especially in collisions at lower speeds, such as 4 km/h, and when towing. This reduces the risk of damage to the cathode dip coating layer of the two connected parts at the connection point.

The main task of the sleeve component is to securely fix the unit to the component receptacle—even during an accident or other impact-like loads—and to stiffen the connection. For this purpose, the sleeve component must not deform or not deform significantly under load, especially in the event of an accident. By deforming the sleeve component in a cold working process, the component is workhardened, wherein a compressive stress is built up in the interior of the sleeve, particularly in relation to the sleeve of the sleeve component. In the case of a short impulse-such as in an accident-on the inner wall of the sleeve, starting from the fastener passing through the sleeve, such as the screw, tearing from the inside out is effectively counteracted. The sleeve of the sleeve component shaped in this way makes a significant contribution to improving the connection between the unit and the component receptacle. In relation to the crash box, the sleeve promotes a controlled deformation of the crash box in the event of an accident.

In order to achieve uniform tensioning, it is provided that the sleeve of the sleeve component has a substantially closed sleeve cross section. This is achieved by shaping the sheet metal blank from which the sleeve is made so that it contacts itself or almost contacts itself. For this purpose, a first material portion of the sheet metal blank is brought together in a contact region with a second material portion to form the sleeve channel. A springback of the material after forming does not represent a significant problem.

Through cold working, the two material portions can be brought together in a variety of ways, forming a contact region, in order to form the sleeve of the sleeve component: In principle, it is possible for the end faces of the sheet metal blank to essentially point towards each other. It is also possible that one portion of material is the end face of the sheet metal blank and the other portion is not the end face. The first material portion is then brought to the second material portion of the sheet metal blank at least in portions at a distance from the end face of the second material portion. A third possibility is that both material portions are not the end face of the sheet metal blank. The sheet metal blank is thus guided with its surfaces together. To form a sleeve channel, the sleeve or the sleeve component then has an alternating portion in which it changes from one bending direction to the other bending direction. All three types of connection have different advantages and can be used depending on the mounting location.

The sheet metal blank as a starting material has a certain thickness. Formed as a sleeve component, this corresponds to the maximum support surface of the sleeve component relative to the unit. If a larger support surface is necessary to support the unit—for example because it is made of a softer material than the sleeve—the end face of the sleeve can be additionally embossed in order to enlarge the support surface.

In this context, it is preferably provided to calibrate the sleeve component laterally after the forming process to form the sleeve, i.e. with respect to its longitudinal extent in the sleeve channel direction. This can be done by compressing the sleeve component. This will level the end faces. Typically calibration of the sleeve is done to accurately adjust the length of the sleeve. Furthermore, in this way, the end faces can be knurled, for example in portions, or otherwise provided with incisions as grid impressions pointing in the sleeve channel extension direction. In this way, this end face, when inserted into the unit, is plastically deformed in portions by the high prestressing forces and in this way adapts to the inner side of the side walls of the unit. In addition, the frictional connection increases during assembly, preventing unwanted slipping of the sleeve component.

It is also conceivable that the sleeve component is only supported in portions relative to the material surrounding the cut-out, for example only in the region of the sleeve or portions thereof.

The cross section of the sleeve of the sleeve component can be essentially circular. However, other cross-sectional shapes are also conceivable, such as elliptical or edged. A sleeve component can also be provided with a sleeve, in the sleeve channel of which two fasteners spaced apart from one another in the longitudinal direction of the unit are arranged. In this way, only one sleeve needs to be provided for two attachments. However, a round cross section is particularly preferred because the notch effect is then lowest. Such a sleeve is less likely to break out under impact loads.

It is preferably provided that the material of the sheet metal blank brought together by cold working to form the sleeve is connected to one another in the contact region. The connection creates a closed sleeve. Such a sleeve is particularly stable and is not significantly deformed even when a load is not introduced longitudinally in relation to the sleeve channel. In particular, buckling is counteracted.

The connection in the contact region for forming the sleeve can be made in particular by a welded connection. This connection is stable and easy to carry out over the entire length of the sleeve channel. In particular, a laser welding connection can be provided in order to minimize the distortion in the sleeve and to reduce the heat input to a minimum, so that the stresses introduced in the sleeve by cold working are not eliminated.

Typically the material of the sheet metal blank is galvanized sheet steel. This is particularly robust and can withstand high loads. The galvanized material is also already protected against corrosion.

During the welding process of such a material, the zinc coating evaporates. In order to achieve a uniform and particularly high-strength welded connection, which also ensures high reproducibility on an industrial scale, at least one material portion of the sheet metal blank, which is brought into the contact region, can be beveled in such a way that a widening gap directed into the sleeve channel is formed in the contact region. This gap provides a degassing path for the evaporated zinc.

An alternative way of connecting, which can also be provided in addition to welding, is a positive connection. For this purpose, in the contact region, one of the two material portions has at least one cut-out, typically a circumferentially closed cut-out, while the other has at least one extension that is complementary to the cut-out. By cold working the sheet metal blank, the extension is inserted into the cut-out. Preferably, it is provided that the extension extends through the cut-out and further preferably contacts, at least in portions, the material surrounding the cut-out on the side of the free end of the extension. This can be done, for example, by embossing the extension so that it is pressed after passing through the cut-out. It can also be provided that the extension has lateral barbs in order to avoid loosening of the connection. The main advantage of this form-fitting connection is that it avoids heat input compared to welding and thus does not damage the corrosion-resistant zinc layer. The choice of material for the sleeve component, or rather of the sleeve, is also significantly facilitated by the purely positive connection, since in this way special materials that cannot be easily welded can also be used. Nevertheless, a firm connection of the two material portions of the sheet metal blank in the contact region is ensured in order to prevent the sleeve from gaping when preload forces are applied or in the event of an accident. Ultimately, the manufacturing process is also significantly shortened.

It is preferably provided that one of the two material portions forming the contact region is provided by a bending zone of the sheet metal blank in the opposite direction to the bending direction for shaping the part of the sleeve surrounding the sleeve channel or a portion immediately adjoining it, and the at least one cut-out for receiving an extension of the other material portion is introduced in this zone. In this way, the cut-outs already made in the flat sheet metal blank are widened in the forming process in such a way that the insertion of the extensions is facilitated. On the back, however, the cut-out remains narrow or can narrow further during the forming process, preventing springback.

The extension of the material portion of the sheet metal blank can be formed on its end face. For this purpose, the sheet metal blank can be punched out while it is still flat. However, it is also possible for the extension to be exposed from the plane of the sheet metal blank. In this case, two flat material portions of the sheet metal blank lie against each other.

In order to form the sleeve component, it is preferably provided that a web projecting transversely to the longitudinal extent is integrally formed from the sheet metal blank on the sleeve. This web preferably projects essentially radially from the sleeve. For this purpose, it is typically provided that one of the two material portions forming the contact region is provided by a bending zone of the sheet metal blank in the direction opposite to the bending direction for shaping the part of the sleeve surrounding the sleeve channel or a portion immediately adjoining it. If a connection of the first material portion with the second material portion of the sheet metal blank is provided to form the sleeve, the at least one cut-out receiving an extension of the other material portion is typically formed in this material portion. The contact region of the two material portions for forming the sleeve channel is therefore in the transition region between the web and the sleeve channel. By means of the web, a particularly simple positioning of the sleeve component within the unit is possible: The web can be in positive contact with a wall of the unit or even an end face of the unit, so that assembly is simplified. It is also possible for the sleeve component to be mounted to the unit on this web using a welded connection. This is particularly interesting in the context of pre-assembly: any mechanical properties of the sleeve component, in particular the sleeve, introduced by cold working, are not influenced by the spaced welding on the web.

It is also possible for the sleeve component to be supported with the end face of the web on the inside of the side wall of the unit. For this purpose, the side wall can also be embossed or have any imprints. In addition, the web or its end face can also be configured for this purpose.

The web can also have at least one extension with which it engages in a corresponding cut-out in the unit. In this way, simple and precise positioning of the sleeve component within the unit is also possible.

To optimize weight, it can be provided that the web itself has one or more cut-outs. These cut-outs can also be used to position and/or move the sleeve component in the forming tool. For this purpose, the cut-outs can be circular or elliptical, for example.

Furthermore, the web can have at least one embossing for stiffening purposes. It is also conceivable that its edges are set up at least in portions to make the web torsion-resistant.

In a particularly advantageous embodiment of the unit, the sleeve component is designed as a double sleeve. In this case also the unit has two further, opposite material cut-outs for the passage of another fastener, such as a screw bolt, which passes through the two opposite side walls of the component receptacle and the unit. The two sleeves of the double sleeve are then each aligned with a pair of material cut-outs and typically support, at least in portions, the material surrounding the material cut-out relative to the opposite side wall. To form the second sleeve of the double sleeve, it is cold-worked in one piece with the first sleeve from the sheet metal blank.

By producing both sleeves from a single sheet metal blank, a particularly high level of dimensional accuracy is achieved with regard to the distance between the two sleeve channels.

Preferably, the second sleeve is also provided or designed according to an aspect described above with reference to the first sleeve. In particular, the material portions of the respective sleeves that are in contact can be connected in the same way, more preferably connected using the same method. This reduces the process time.

If the material portions of the two sleeves that are in contact are each welded, it can preferably be provided that the portions of the sheet metal blank intended for sleeve forming are cold-worked in the same direction to form the sleeves. The two free material portions then essentially point in different directions. This then results in an 8-shape, for example. Such a configuration is particularly advantageous if the material portions are connected to one another by welding. In this way, tolerance compensation related to any thermal distortion is automatically ensured.

In another embodiment, it is provided that the portions of the sheet metal blank intended for sleeve forming are cold-worked in opposite directions to form the sleeves. The two free material portions then point essentially in the same direction. Such a forming is easier to produce due to a simpler tool.

A sleeve component is preferably provided in which the web already mentioned above is provided between the two sleeves. In this case, the web is integrally formed on both sleeves. In this way, a precise distance between the two sleeves can be determined, while both sleeves can also be positioned in the unit at the same time using the web. In addition, the sleeve end faces do not need to be connected to the unit, for example as part of a welding process, although this is in principle possible.

The web arranged between the two sleeves can essentially connect the sleeves to one another at the shortest distance. However, it is also possible that this web follows a curved path in order to provide certain properties—such as a certain strength.

It can be provided that the unit is embossed inwards in the region of its material cut-outs, providing a contact surface for the end face of the at least one sleeve. By embossing, the material of the unit is additionally stiffened in the region of the sleeve, so that lateral impacts are better absorbed into the component receptacle.

It can also be provided that the sleeve component penetrates at least in portions, in particular in at least one sleeve, at least one side wall of the unit. A portion of the sleeve component may then be connected to the unit by a welding connection and in this way the sleeve component may be supported on the side wall of the unit.

It is also conceivable that the sleeve has portions of different diameters along its longitudinal extent. A diameter is then provided at the ends which is smaller than in the middle region. If the sleeve extends through the side wall of the unit with its portion of smaller diameter, the side wall can be supported on the projection provided by the difference in diameter.

Basically, one is free to choose the material for the sheet metal blank to form the sleeve component. However, it is preferred to use aluminum or steel.

In addition to the above-mentioned design of the unit as a crash box and the component receptacle as a longitudinal beam, the unit can also be designed, for example, as an axle support or thrust panel, each connected to parts of the body as a component receptacle.

A method of manufacturing a unit described above may comprise the following steps:

- providing a unit,
- providing a sheet metal blank,
- forming the sheet metal blank to provide at least one sleeve component having a sleeve, so that a free end of the sheet metal blank is brought towards the sheet metal blank,
- connecting the contact region to the free end of the sheet metal blank,
- inserting the sleeve component into the unit and connecting the sleeve component to the unit.

In particular, the forming step can be carried out in a single tool. This typically takes place in a multi-stage forming process.

It can preferably be provided that the contact region is connected to the free end of the sheet metal blank by welding, in particular by laser welding. Laser welding in particular can be used without additional material and thus reduces weight.

In another embodiment, it can be provided that at least one cut-out is provided in the sheet metal blank in the contact region, and that the free end of the sheet metal blank has at least one extension that is complementary to the cut-out, and that the extension is inserted into the cut-out to connect the contact region to the free end of the sheet metal blank. In this way, the connecting step can also be carried out in the same tool in which the sheet metal blank is formed. This saves tool costs and process time due to less transfer routes.

To press the extension within the cut-outs, it can be provided that after the extension has been introduced into the cut-out, the extension is reshaped in such a way that it contacts the material surrounding the cut-out, so that there is a positive connection between the extension and the cut-out against the direction of insertion of the extension.

It can also be provided that in order to provide a sleeve component with a single sleeve during the forming process, a double sleeve as described above is produced and then divided into the two sleeves.

BRIEF DESCRIPTION OF THE DRAWINGS

The following description is provided using example embodiments with reference to the figures, wherein.

DETAILED DESCRIPTION

Figure 1:
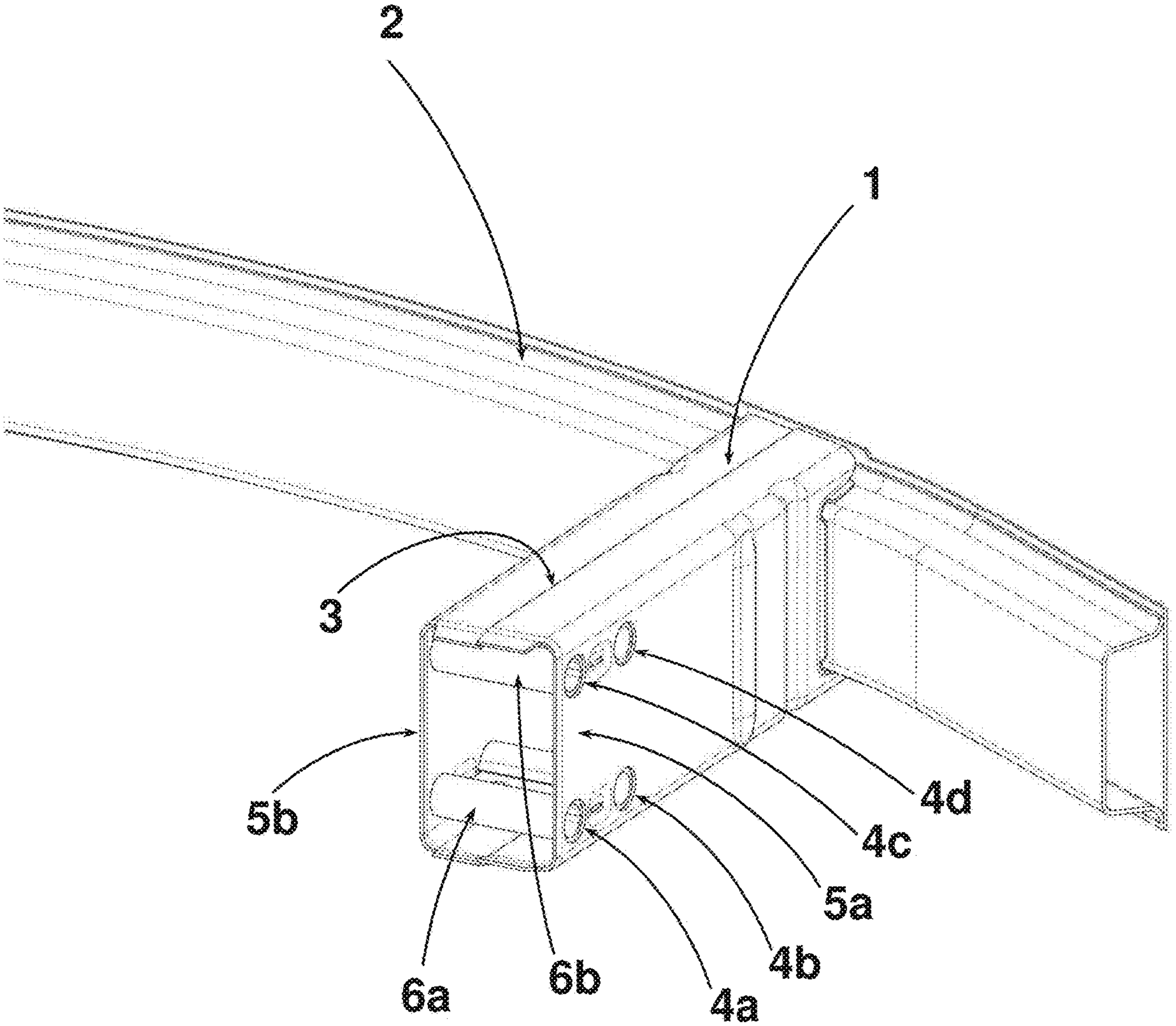
FIG. 1 shows an example unit, here designed as a crash box, connected to a bumper cross beam with inserted sleeve components.

FIG. 1 shows a unit according to the disclosure, here designed and referred to below as a crash box 1, connected to a bumper cross beam 2. The bumper cross beam 2 points forward in the longitudinal direction of the vehicle. The crash box 1 is connected via an end connector portion 3 to a component receptacle (not shown), here designed and referred to below as a longitudinal beam. For this purpose, the longitudinal beam in the connection region is designed as a hollow profile enclosing the end connector portion 3 of the crash box 1, into which the end connector portion 3 engages.

To connect the longitudinal beam to the end connector portion 3 of the crash box 1, the crash box 1 has respective opposite material cut-outs 4*a*-4*d* in the side walls 5*a*, 5*b* (the cutouts are only visible in the side wall 5*a* in FIG. 1). The longitudinal beam also has respective complementary cut-outs. Fasteners (not shown), here in the form of screws/bolts, are passed through these cut-outs 4*a*-4*d* in order to pretension the longitudinal beam with the crash box 1.

In order for the crash box 1 or its end-side connector portion 3 to not collapse under the preload, which is preferably 65 kN, sleeve components 6*a*, 6*b* designed as double sleeves are inserted inside the end connector portion 3 of the crash box 1. Portions of the sleeve components, in this case at least the end faces of the sleeves, contact the inner sides of the side walls 5*a*, 5*b*, or the material surrounding the cut-outs 4*a*-4*d*, and thus stiffen the side walls 5*a*, 5*b* against each other in the longitudinal extent or direction of the fastener passed therethrough. The sleeve channels of the sleeves of the sleeve components 6*a*, 6*b* are aligned with the material cut-outs 4*a*-4*d*.

Figure 2:
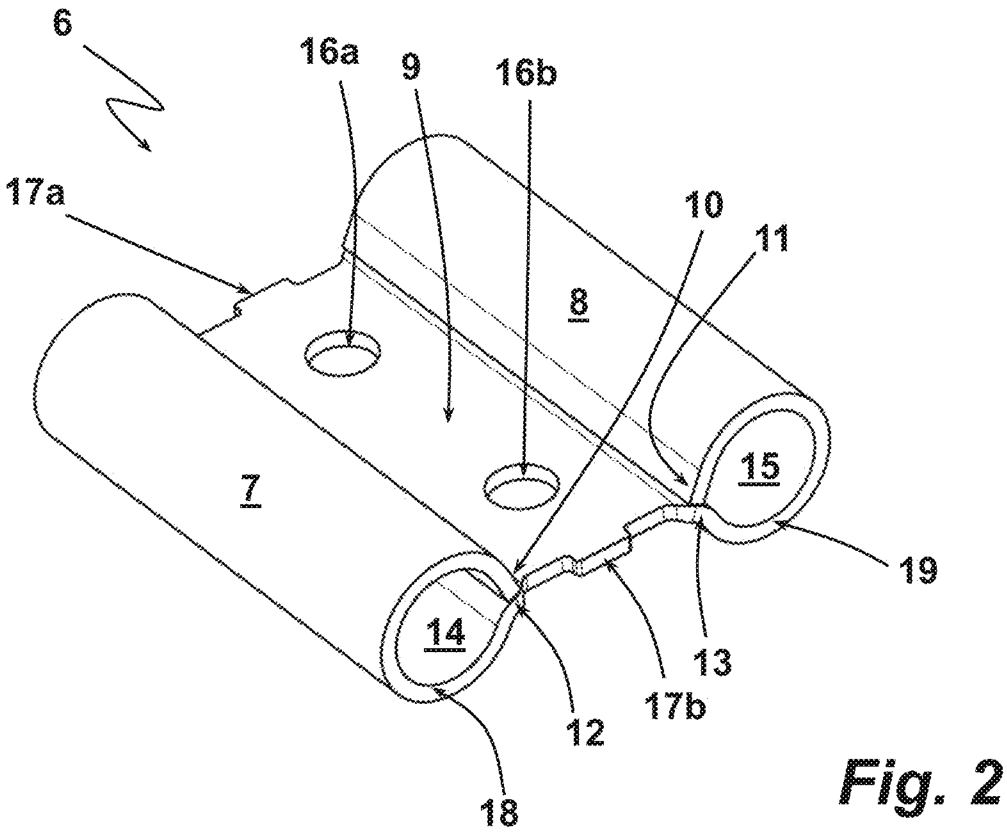
FIG. 2 shows a sleeve component designed as a double sleeve according to a first embodiment.

FIG. 2 shows a sleeve component 6 designed as a double sleeve in a first embodiment. The sleeve component 6 comprises a first sleeve 7 and a second sleeve 8 as well as a web 9 located therebetween. The sleeve component 6 is made from a sheet metal blank using a cold working process. For this purpose, the end-side sheet metal portions have been bent into sleeves 7, 8, so that a respective first material portion 10, 11, here in the form of two opposite end faces of the sheet metal blank, contacts a respective further material portion 12, 13 of the sheet metal blank. In this way, essentially closed sleeve channels 14, 15 are provided.

In order to form the web 9 projecting from the respective sleeve channel 14, 15 in the region of the respective second material portion 12, 13, the sheet metal blank was bent in a first direction, then continuously in the respective other direction until the respective first material portion 10, 11 contacted the respective second material portion 12, 13 in the contact region. The first sleeve 7 of the sleeve component 6 has thus been bent clockwise, the second sleeve 8 counterclockwise. The sheet metal blank has thus been bent in opposite directions to form the sleeves 7, 8.

Figure 3:
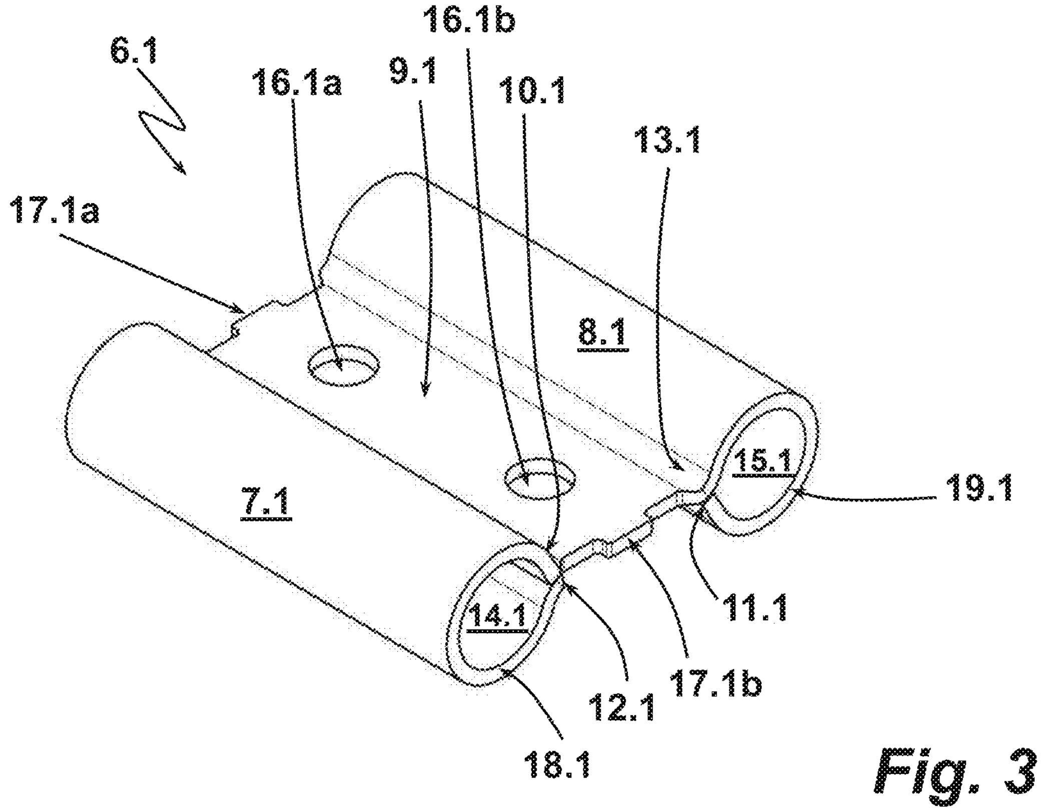
FIG. 3 shows a sleeve component according to a further embodiment.

The sleeve component 6.1 shown in FIG. 3 is manufactured in the opposite way: the sheet metal blank is deformed clockwise to form the first sleeve 7.1, just as it is to form the second sleeve 8.1. The sheet metal blank has thus been formed in the same direction to form the two sleeves 7.1, 8.1.

In the two example embodiments described above, the respective first material portion 10, 10.1, 11, 11.1 is materially connected to the respective second material portion 12, 12.1, 13, 13.1 via a laser welding process. In this way, the sleeves 7, 7.1, 8, 8.1 are prevented from breaking open.

The two sleeves 7, 7.1, 8, 8.1 of the sleeve components 6, 6.1 are installed essentially in the horizontal plane in the crash box 1 (see also FIG. 1). The two sleeves 7, 7.1, 8, 8.1 thus lie one behind the other in one plane in the longitudinal direction of the vehicle.

The web 9, 9.1 projects radially from the sleeves 7, 7.1, 8, 8.1. In particular, it is formed in one plane, although additional embossing or adjustments are possible depending on the installation situation within the crash box 1. By connecting the two sleeves 7, 7.1, 8, 8.1 with the web 9, 9.1 on essentially the shortest route, a particularly light component is provided.

The web 9, 9.1 includes cut-outs 16*a*, 16.1*a*, 16*b*, 16.1*b*. On the one hand, these also serve to reduce weight and, on the other hand, to position and move the sheet metal blank during the cold working process.

Furthermore, extensions 17*a*, 17.1*a*, 17*b*, 17.1*b* are formed on the web 9, 9.1, or surrounding material has been removed from the sheet metal blank. The extensions 17*a*, 17.1*a*, 17*b*, 17.1*b* engage in cut-outs within embossments in the crash box 1. In this way, the sleeve component 6, 6.1 can be held within a crash box 1 as part of the pre-assembly and then also welded to the crash box 1 at this point.

The thickness of the sheet metal blank corresponds to the end faces 18, 18.1, 19, 19.1 of the sleeves 7, 7.1, 8, 8.1 with which they support the side walls 5*a*, 5*b* of the crash box 1 against one another.

Figure 4:
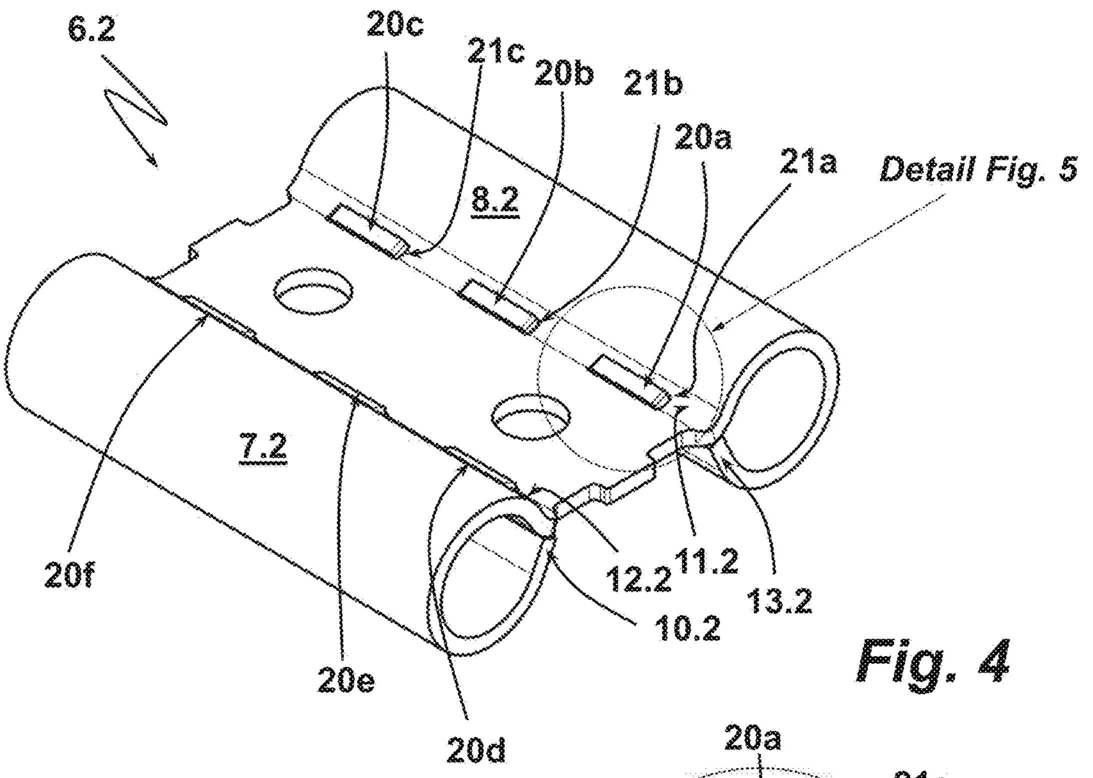
FIG. 4 shows a sleeve component according to a further embodiment.
Figure 5:
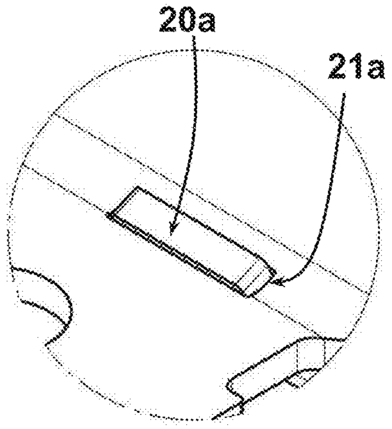
FIG. 5 shows a detailed representation of a portion of FIG. 4.

FIG. 4 shows an embodiment of a sleeve component 6.2, in which the first material portion 10.2, 11.2 has three respective extensions 20*a*-20*f*, which pass through circumferentially closed cut-outs 21*a*-21*c* in the respective second material portions 12.2, 13.2 (the cut-outs are only visible in the material portion 13.2 in FIG. 4). A detailed representation of this is shown in FIG. 5. It can be clearly seen here how the extension 20*a* extends through the cut-out 21*a*. Not shown, but provided, is that the end face of the extension 20*a* is embossed so that it engages over the cut-out 21*a*, so that a mushroom-shaped extension is formed. The extension can be deformed symmetrically or asymmetrically. Due to the position in the tool, oblique pressing may be desired or necessary and may result in an asymmetrical formation of the extension. In any case, the respective first material portion 10.2, 11.2 surrounds the respective second material portion 12.2, 13.2; the two material portions 10.2, 12.2, 11.2, 13.2 are each connected to one another, forming a contact region. For additional security, it can be provided that the extensions 20*a*-20*f* are welded to the respective cut-outs 21*a*-21*c*.

Figure 6:
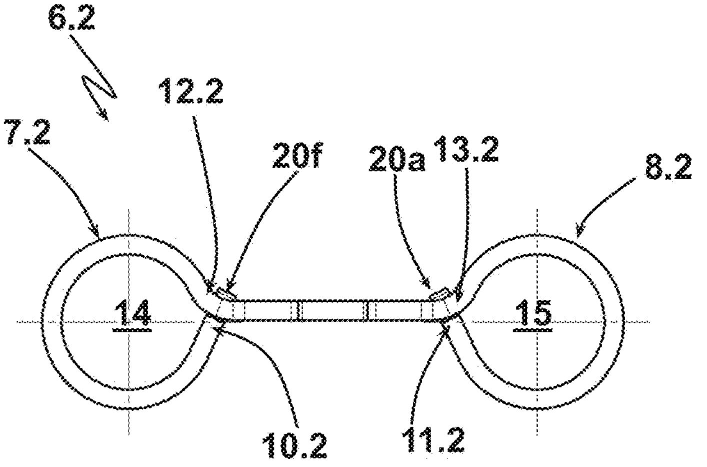
FIG. 6 shows a view of the end face of the sleeve component according to FIG. 4.

A side view is shown in FIG. 6 to facilitate visualization of the sleeve component 6.2. It can be clearly seen here that the respective first material portion 10.2, 11.2 of the sleeves 7.2, 8.2 forming the sleeve channels 14.2, 15.2 passes through the respective second material portion 12.2, 13.2 with extensions 20*a*-20*f*. To easily produce this sleeve component 6.2, the first material portions 10.2, 11.2 of the sheet metal blank are formed in opposite directions in a cold working process.

The invention has been described on the basis of example embodiments. Without departing the scope of the claims, numerous other embodiments and options for implementing the inventive concept(s) are apparent to a person skilled in the art, without these having to be shown or explained in greater detail in the context of this disclosure.

LIST OF REFERENCE NUMERALS

- 1 unit/crash box
- 2 component receptacle/bumper cross beam
- 3 end connector portion
- 4*a*-4*d* material cut-out
- 5*a*, 5*b* side wall
- 6, 6*a*, 6*b*, 6.1, 6.2 sleeve component/double sleeve
- 7, 7.1, 7.2 first sleeve
- 8, 8.1, 8.2 second sleeve
- 9, 9.1 web
- 10, 10.1, 10.2, 11, 11.1, 11.2 first material portion
- 12, 12.1, 12.2, 13, 13.1, 13.2 second material portion
- 14, 14.1, 14.2, 15, 15.1, 15.2 sleeve channel
- 16*a*, 16.1*a*, 16*b*, 16.1*b* cut-out in the web
- 17*a*, 17.1*a*, 17*b*, 17.1*b*, extension on the web
- 18, 18.1, 19, 19.1 end face
- 20*a*-20*f* extension

The invention claimed is:

1. A method of producing a unit for installation in a motor vehicle, the unit comprising a connector portion for engaging a component receptacle of the motor vehicle and connecting the unit thereto, the connector portion having at least two opposing material cut-outs for passing through a fastener which engages through two opposing side walls of the unit, the method comprising the steps:

cold working a sheet metal blank to form a sleeve component having at least one sleeve, such that a free end of the sheet metal blank is brought toward and into contact with a contact region of the sheet metal blank to form a sleeve of the sleeve component, the sleeve defining a sleeve channel, inserting the sleeve component into the connector portion such that the sleeve channel of the sleeve is aligned with two of the material cut-outs of the connector portion, and connecting the sleeve component to the connector portion, wherein the sleeve component is supported, at least in portions, on an inside of the connector portion on material which surrounds the material cut-outs.

2. The method of claim 1, wherein end faces of the sleeve are supported on the inside of the connector portion on the material surrounding the material cut-outs.

3. The method of claim 1, wherein the sleeve component comprises a web extending transversely relative to a longitudinal extent of the sleeve.

4. The method of claim 1, wherein the sleeve of the sleeve component is a first sleeve, and the connector portion further comprises two additional material cut-outs for passing through another fastener, the method further comprising;

prior to the step of inserting the sleeve component into the connector portion, coldworking a free end of the sheet metal blank opposite the first sleeve to form a second sleeve of the sleeve component, and during the step of inserting the sleeve component into the connector portion, arranging the sleeve component such that the sleeve channel of the second sleeve is aligned with the two additional material cut-outs.

5. The method of claim 4, wherein the respective free ends of the sheet metal blank forming the respective first and second sleeves are cold-worked in opposite directions to one another to form the sleeves.

6. The method of claim 4, wherein the respective free ends of the sheet metal blank forming the respective first and second sleeves are cold-worked in a same direction as one another to form the sleeves.

7. The method of claim 4, wherein the first and second sleeves are connected by a web of the sleeve component extending transversely relative to a longitudinal extent of the sleeves.

8. The method of claim 1, wherein the sheet metal blank is aluminum alloy or steel.

9. The method of claim 1, wherein the contact region is connected to the free end prior to inserting the sleeve component into the connector portion.

10. The method of claim 9, wherein the contact region is connected to the free end by welding.

11. The method of claim 10, wherein the contact region is connected to the free end by laser welding.

12. The method of claim 9, wherein at least one cut-out is formed in the sheet metal blank in the contact region, and the free end of the sheet metal blank has at least one extension complementary to the cut-out, and wherein the extension is inserted into the cut-out to connect the contact region to the free end.

13. The method of claim 12, wherein the contact region having the at least one cut-out, which receives the extension of the free end, is provided by a bending zone of the sheet metal blank in a direction opposite to a bending direction of the sleeve enclosing the sleeve channel or by a section adjacent the bending zone.

14. The method of claim 12, wherein after the extension has been inserted into the cut-out, the extension is reshaped such that the extension contacts material surrounding the cut-out.

* * * * *